United States Patent
Jonsson (10) Patent No.: US 9,820,095 B2
(45) Date of Patent: Nov. 14, 2017

(54) POWER EFFICIENT PROXIMITY DETECTION

(71) Applicant: Sony Corporation, Tokyo (JP)

(72) Inventor: Håkan Jonsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/891,080

(22) PCT Filed: Apr. 2, 2014

(86) PCT No.: PCT/JP2014/001927
§ 371 (c)(1),
(2) Date: Nov. 13, 2015

(87) PCT Pub. No.: WO2015/151133
PCT Pub. Date: Oct. 8, 2015

(65) Prior Publication Data
US 2017/0013401 A1     Jan. 12, 2017

(51) Int. Cl.
*H04W 24/00* (2009.01)
*H04W 4/02* (2009.01)
(Continued)

(52) U.S. Cl.
CPC ......... *H04W 4/021* (2013.01); *H04L 61/6022* (2013.01); *H04W 4/008* (2013.01);
(Continued)

(58) Field of Classification Search
CPC ..... H04W 4/021; H04W 4/008; H04W 4/023; H04W 52/0229; H04W 68/005; Y02B 60/50; H04L 61/6022
(Continued)

(56) References Cited

U.S. PATENT DOCUMENTS

2008/0102896 A1    5/2008   Wang et al.
2010/0304674 A1*  12/2010   Kim .................. H04W 76/02
                                            455/41.2
(Continued)

FOREIGN PATENT DOCUMENTS

KR    1020120003716       1/2012
WO    WO 2008/018937 A1   2/2008

OTHER PUBLICATIONS

Notification of Transmittal of the International Search Report and Written Opinion of the International Searching Authority, PCT Application No. PCT/JP2014/001927, Jan. 28, 2015.
(Continued)

*Primary Examiner* — Khai M Nguyen
(74) *Attorney, Agent, or Firm* — Myers Bigel, P.A.

(57) ABSTRACT

Location information of first and second mobile terminals may be received at an application server. Location information may include a cellular position and/or a Wi-Fi access point identifier. It is determined whether the first mobile terminal is in a same short-range wireless transmission area as the second mobile terminal based on a comparison of the first location information with the second location information. An instruction is sent to the first mobile terminal instructing the first mobile terminal to send a notification addressed to the second mobile terminal using a short-range wireless transmission protocol responsive to a determination that the first mobile terminal is in the same short-range wireless transmission area as the second mobile terminal.

20 Claims, 11 Drawing Sheets (51) Int. Cl.
*H04W 4/00* (2009.01)
*H04L 29/12* (2006.01)
*H04W 52/02* (2009.01)
*H04W 68/00* (2009.01)

(52) U.S. Cl.
CPC ....... *H04W 4/023* (2013.01); *H04W 52/0229* (2013.01); *H04W 68/005* (2013.01); *Y02B 60/50* (2013.01)

(58) Field of Classification Search
USPC ............... 455/456.3, 456.1, 456.2, 550.1
See application file for complete search history.

(56) References Cited

U.S. PATENT DOCUMENTS

| | | | | |
|---|---|---|---|---|
| 2011/0207509 | A1* | 8/2011 | Crawford | H04W 52/0258 455/574 |
| 2013/0115970 | A1 | 5/2013 | Hapsari et al. | |
| 2013/0275881 | A1* | 10/2013 | Hahm | H04L 51/32 715/752 |
| 2014/0004796 | A1 | 1/2014 | Cakulev et al. | |
| 2014/0213292 | A1 | 7/2014 | Murayama et al. | |
| 2014/0357198 | A1* | 12/2014 | Ye | H04W 4/02 455/73 |
| 2015/0172037 | A1 | 6/2015 | Morita | |
| 2016/0057598 | A1* | 2/2016 | Beyer, Jr. | H04W 12/08 455/404.2 |
| 2016/0084936 | A1* | 3/2016 | Smith | H04W 64/00 455/456.1 |
| 2016/0323863 | A1* | 11/2016 | Park | H04W 4/005 |

OTHER PUBLICATIONS

InterDigital Communications: "UE triggered EPC-assisted direct discovery via control plane PC3," 3GPP Draft; S2-140228 D14 Improvements CL, 3$^{rd}$ Generation Partnership Project (3GPP), Mobile Competence Centre, 650, Route Des Lucioles; F-06921 Sophia-Antipolis Cedex, France., vol. SA WG2, No. Taipei, Taiwan, Jan. 20-24, 2014, 7 pages.

Orange: "Corrections to consolidated Annexes for TS 23.303," 3GPP Draft; S2-140696 Editorial Corrections to Consolidated Annexes, 3$^{rd}$ Generation Partnership Project (3GPP), Mobile Competence Centre; 650, Route Des Lucioles; F-06921 Sophia-Antipolis Cedex; France, vol. SA WG2, No. San Jose Del Cabo, Mexico, Feb. 17-21, 2014, 23 pages.

Notification of Reason for Refusal (Office Action) dated Aug. 4, 2017 for corresponding Korean Application No. 10-2016-7030080 (9 pages, including English translation).

Notification of Reason for Refusal (Office Action) dated Sep. 26, 2017 for corresponding Japanese Application No. 2016-56-953 (9 pages, including English translation).

* cited by examiner

POWER EFFICIENT PROXIMITY DETECTION

CROSS-REFERENCE TO RELATED APPLICATION

This application is a 35 U.S.C. §371 national phase application of PCT International Application No. PCT/JP2014/001927, filed on Apr. 2, 2014, the disclosure and content of which is incorporated herein by reference in its entirety as if set forth fully herein.

TECHNICAL FIELD

Embodiments of the present invention relate to electronic devices, wireless communication and application services.

BACKGROUND ART

Close proximity or short-range wireless transmission protocols, such as Bluetooth (registered trademark) protocols, can be used to detect when two devices are in close proximity. However, some Bluetooth (registered trademark) technologies can consume more power than desired. Also, some users may be reluctant to have a Bluetooth (registered trademark) capability turned on at all times due to the risk of unsolicited messages ("BlueJacking").

Some technologies may detect devices within a proximity of a beacon or transmission station. However, power is consumed when scanning for devices within proximity of the beacon.

Other low energy short-range wireless protocols have been designed to save energy. However, they still use a significant amount of energy scanning for other devices.

SUMMARY

Various embodiments described herein provide for reduced power usage in short-range and/or low energy wireless communications. According to some embodiments, an electronic device may include a processor and a memory coupled to the processor and comprising computer readable program code embodied in the memory that when executed by the processor causes the processor to perform operations. The operations may include receiving, at the electronic device, first location information of a first mobile terminal. Location information may include a cellular position and/or a Wi-Fi access point identifier. The operations may further include receiving, at the electronic device, second location information of a second mobile terminal. The operations may further include determining whether the first mobile terminal is in a same short-range wireless transmission area as the second mobile terminal based on a comparison of the first location information with the second location information and sending an instruction to the first mobile terminal instructing the first mobile terminal to send a notification addressed to the second mobile terminal using a short-range wireless transmission protocol responsive to a determination that the first mobile terminal is in the same short-range wireless transmission area as the second mobile terminal.

According to further embodiments, the instruction may further instruct the mobile terminal to send the notification while scanning for other devices using the short-range wireless transmission protocol turned off or disabled for the first mobile terminal. The short-range wireless transmission protocol is not a Wi-Fi IEEE 802.11 transmission protocol and may be an IEEE 802.15 transmission protocol or a Bluetooth (registered trademark) protocol.

According to some embodiments, the cellular position may include one or more cell tower identifiers and/or cell tower triangulation information. The notification may be addressed to a MAC address of the second mobile terminal.

According to some embodiments, the operations may further include storing a first user identity, such as a phone number or social application identity, corresponding to a MAC address of the first mobile terminal and storing a second user identity corresponding to a MAC address of the second mobile terminal. The determining may be responsive to receiving a request from the first mobile terminal, the request including the second user identity.

According to some embodiments, a method may include receiving, at an electronic device, first location information of a first mobile terminal. Location information may include a cellular position and/or a Wi-Fi access point identifier. The method may also include receiving, at the electronic device, second location information of a second mobile terminal. The method may also include determining whether the first mobile terminal is in a same short-range wireless transmission area as the second mobile terminal based on a comparison of the first location information with the second location information. The method may also include sending an instruction to the first mobile terminal instructing the first mobile terminal to send a notification addressed to the second mobile terminal using a short-range wireless transmission protocol responsive to a determination that the first mobile terminal is in the same short-range wireless transmission area as the second mobile terminal.

According to further embodiments, the instruction may further instruct the mobile terminal to send the notification while scanning for other devices using the short-range wireless transmission protocol turned off or disabled for the first mobile terminal. The short-range wireless transmission protocol may be at least one of an IEEE 802.15 protocol and a Bluetooth (registered trademark) protocol. The cellular position may include one or more cell tower identifiers and/or cell tower triangulation information. The notification may be addressed to a MAC address of the second mobile terminal.

According to some embodiments, a mobile terminal may include a processor and a memory coupled to the processor and comprising computer readable program code embodied in the memory that when executed by the processor causes the processor to perform operations. The operations may include receiving, at a mobile terminal or from a display of the mobile terminal, a selection of a user identity associated with another mobile terminal and sending, from the mobile terminal to another computing device such as an application server, a request for an instruction in response to the other mobile terminal associated with the selected user identity being in a same short-range wireless transmission area as the mobile terminal. The operations may further include sending, from the mobile terminal to the application server, location information of the mobile terminal. The location information may include a cellular position and/or a Wi-Fi access point identifier. The operations may also include receiving an instruction, at the mobile terminal from the application server, to send a notification addressed to the other mobile terminal using a short-range wireless transmission protocol and sending a notification addressed to the other mobile terminal using the short-range wireless transmission protocol.

According to some further embodiments, the notification may be sent while scanning for other devices using the short-range wireless transmission protocol is turned off. The short-range wireless transmission protocol may be at least one of an IEEE 802.15 protocol and a Bluetooth (registered trademark) protocol.

The cellular position may include one or more cell tower identifiers and/or cell tower triangulation information. The notification may be addressed to a MAC address of the other mobile terminal.

Other devices, methods, and/or computer program products according to embodiments of the invention will be or become apparent to one with skill in the art upon review of the following drawings and detailed description. It is intended that all such additional devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF DRAWINGS

The accompanying drawings, which are included to provide a further understanding of the invention and are incorporated in and constitute a part of this application, illustrate certain embodiment(s) of the invention.

DESCRIPTION OF EMBODIMENTS

Close proximity protocols, such as Bluetooth (registered trademark) protocols, can be used to scan and detect when two devices are in close proximity. However, such Bluetooth (registered trademark) technology scanning methods can consume more power than desired. Also, some users may be reluctant to have Bluetooth (registered trademark) capability turned on at all times due to the risk of unsolicited messages ("BlueJacking"). Bluetooth (registered trademark) low energy technology (BLE) has lowered the power consumption on the side of the peripheral device, or the device that is to be detected. However, BLE has not reduced power consumption when scanning for devices. Embodiments of the present invention provide for a device to use less power to notify a user that its device is in close enough proximity to another device to use a short-range wireless transmission protocol, such as Bluetooth (registered trademark) technology, for further communications. In fact, at this range, the other user may be close enough in proximity to socially interact with the user in person. Closer proximity detection may also trigger various applications.

For example, if user A sets a reminder in an application to be triggered when he or she next meets user B, the device of user A will be able to address the device of user B with a single short-range wireless transmission protocol message when they are in close proximity without device A having to keep the short-range technology on indefinitely and continuously scanning for device B, consuming battery power. A cloud server, such as an application server, may track and/or compare very coarse-grained locations of devices A and B to determine when to notify device A to turn on a short-range capability, send a message with the short-range capability to device B, or to start detecting device B. As a result, power can be saved and security can be increased by not keeping the short-range capability continuously on and scanning for devices.

Continuous fine-grained location tracking and comparing of all people against each other is not an optimal solution due to scalability issues, privacy issues, robustness issues and accuracy issues. However, embodiments of the present invention provide for a more battery friendly alternative.

Figure 6:
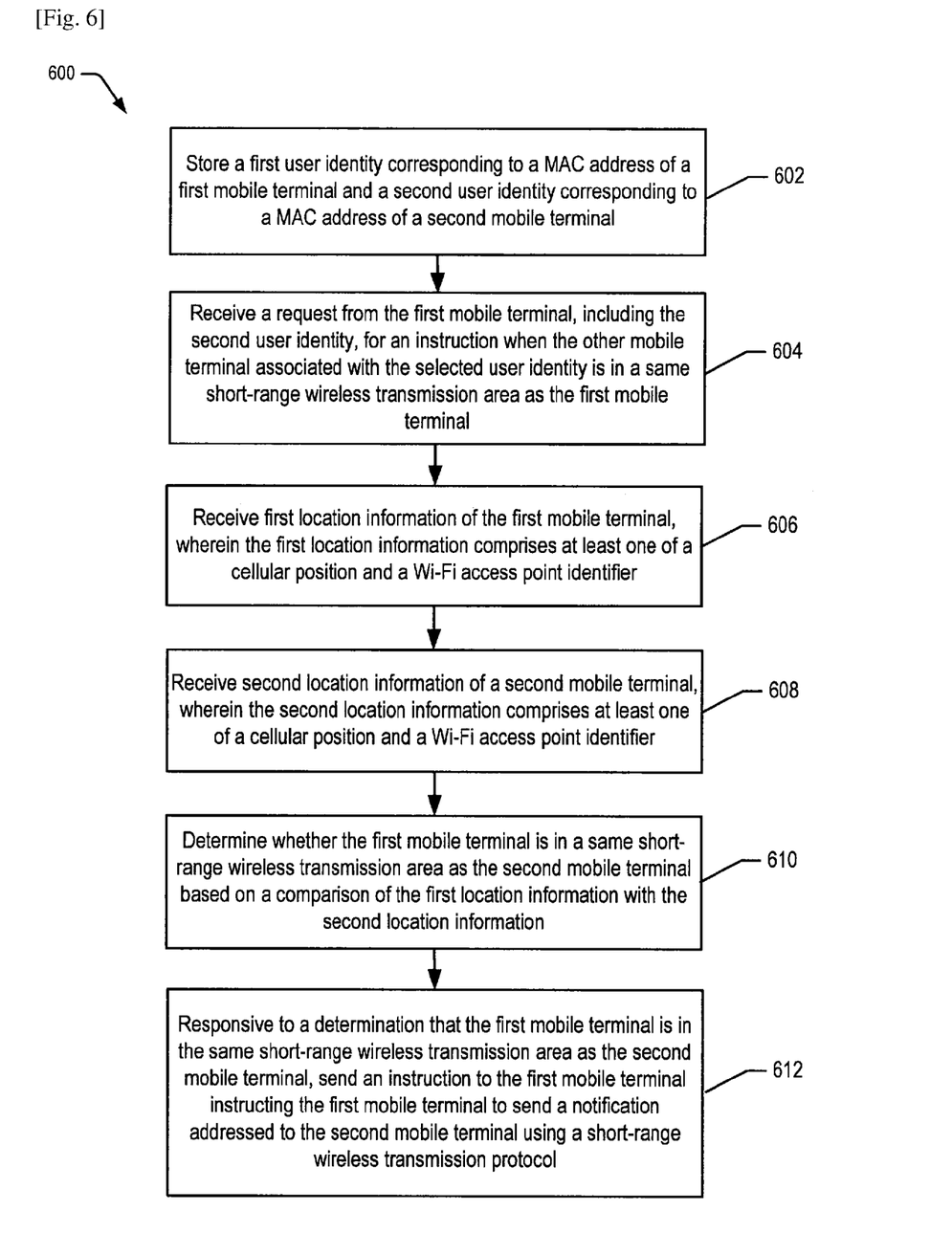
FIG. 6 is a flowchart illustrating a process for a mobile terminal to address another mobile terminal using a short-range wireless protocol, according to various embodiments.

In some embodiments, device A may know the MAC address (or PHY or other device specific address) of device B and a user identity (e.g., phone number, social application identity) of the user of device B. This link between the MAC address and a user identity can be obtained through product registration or configuration of a new application installed on the devices. By combining the registration of MAC addresses with user identities, it is also possible to match devices to people, allowing for a user to select a person rather than a device to trigger a notification or reminder. FIG. 6 illustrates an example process 600 for notifying another device through a short-range wireless transmission protocol, according to various embodiments. As shown in block 602 of FIG. 6, MAC addresses and corresponding user identities may be stored at a cloud server or application server.

Figure 1:
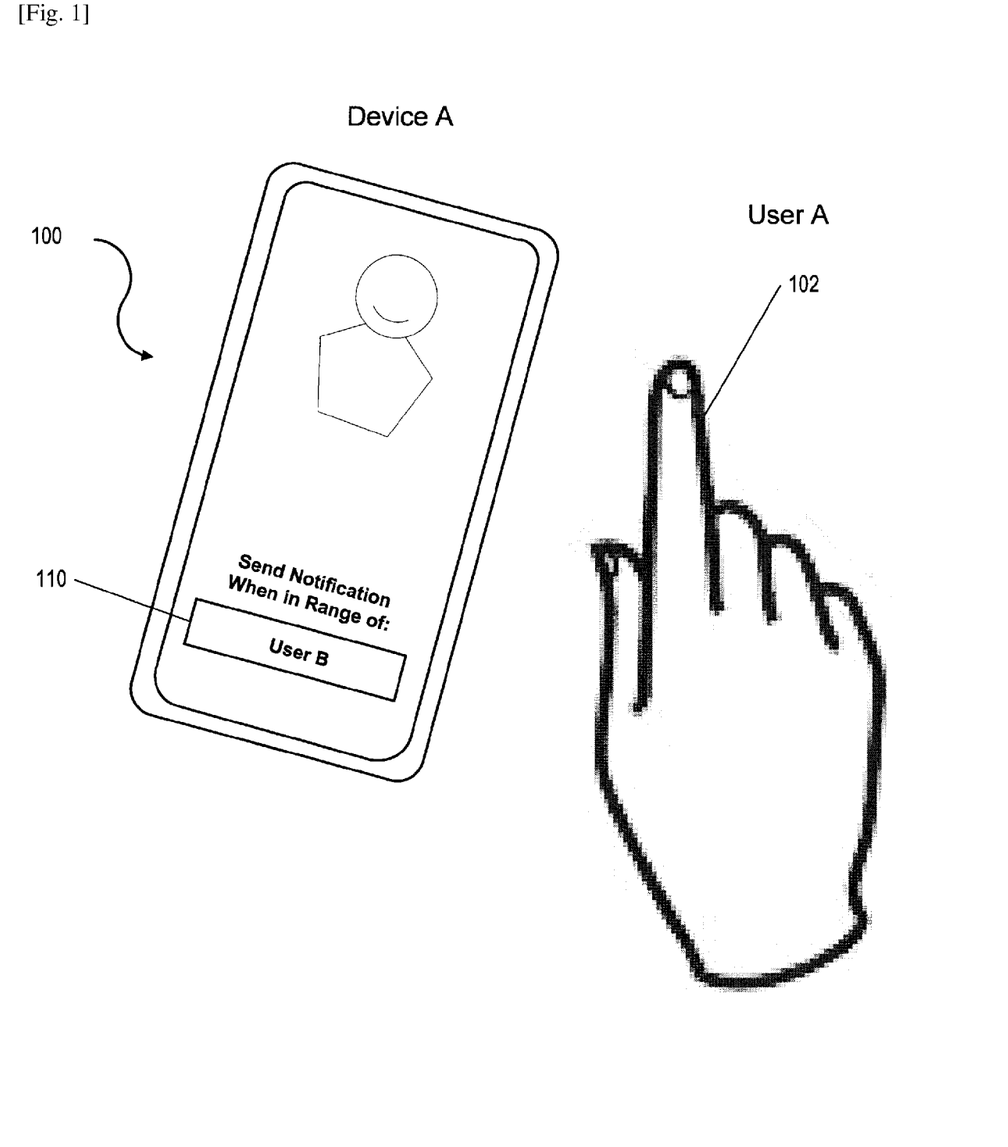
FIG. 1 illustrates a user requesting a notification at a mobile terminal, according to various embodiments of the present invention.

As shown in FIG. 1, the user 102 of Device A, or mobile terminal 100, may request that mobile terminal 100 send a notification to a selected user's device using a short-range wireless transmission protocol when the other device is with a same short-range transmission area (block 604 of FIG. 6). For example, mobile terminal 100 may be triggered or instructed to address Device B, or mobile terminal 200, with a Bluetooth (registered trademark) protocol message which essentially says "Here I am!", such that a Bluetooth (registered trademark) protocol pairing, message, service or application may operate between the two devices within the short-range transmission area. This avoids the need for mobile terminal 100 to constantly scan for mobile terminal 200 with Bluetooth (registered trademark) scanning technology. The other user's mobile terminal 200 may be selected through a selection of a user identity of the other user, such as selecting User B in the application. This selection 110 is shown in FIG. 1.

In some cases, mobile terminal 200 (see FIG. 3) is notified through a messaging system that mobile terminal 100 may be attempting to determine when mobile terminal 200 comes into proximity of the short-range wireless protocol transmissions of mobile terminal 100. The messaging system can be SMS or application specific over TCP/IP through an application server, such as application server 210 in FIG. 2.

Figure 2:
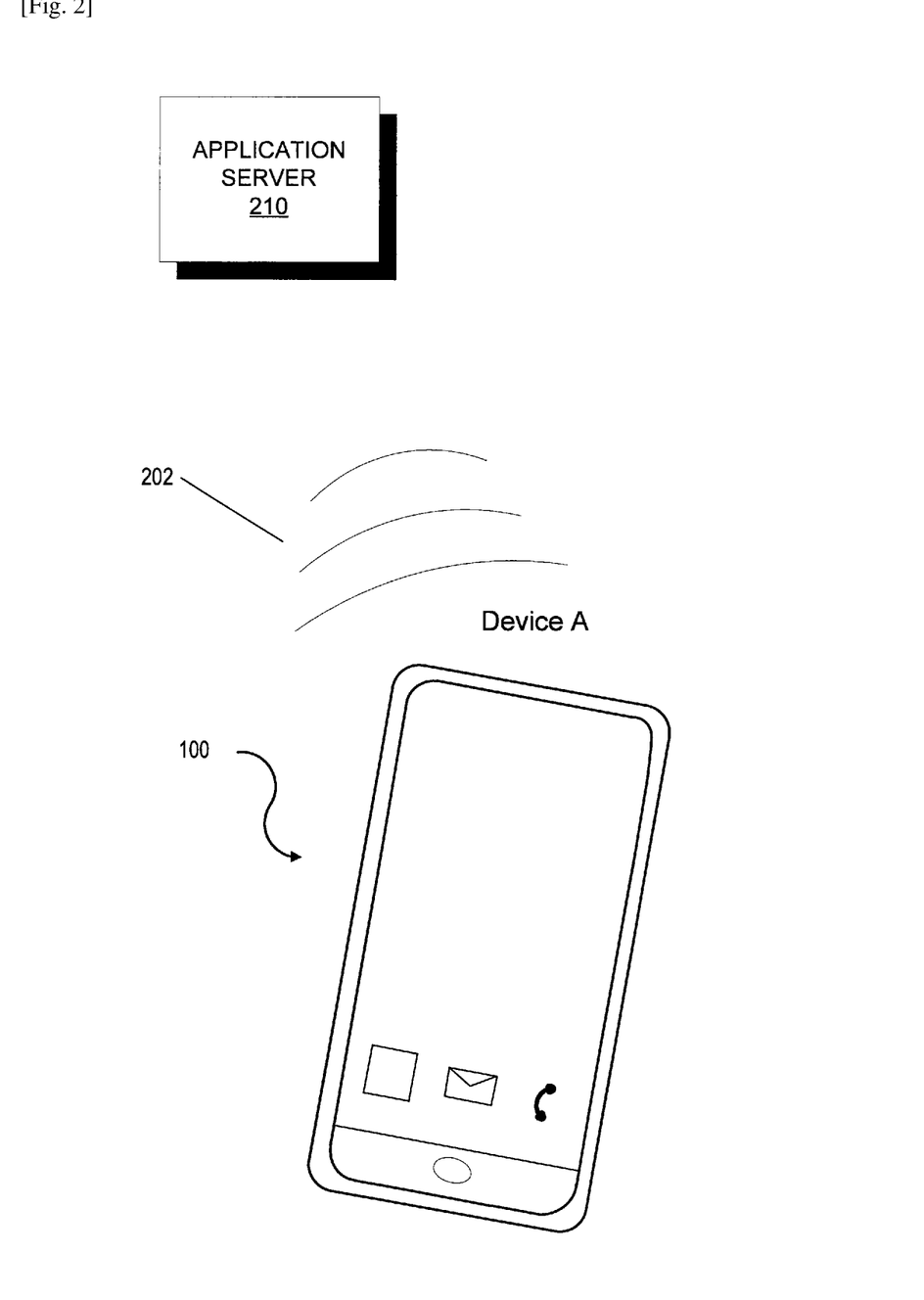
FIG. 2 illustrates a first mobile terminal sending location information to a server, according to various embodiments.
Figure 3:
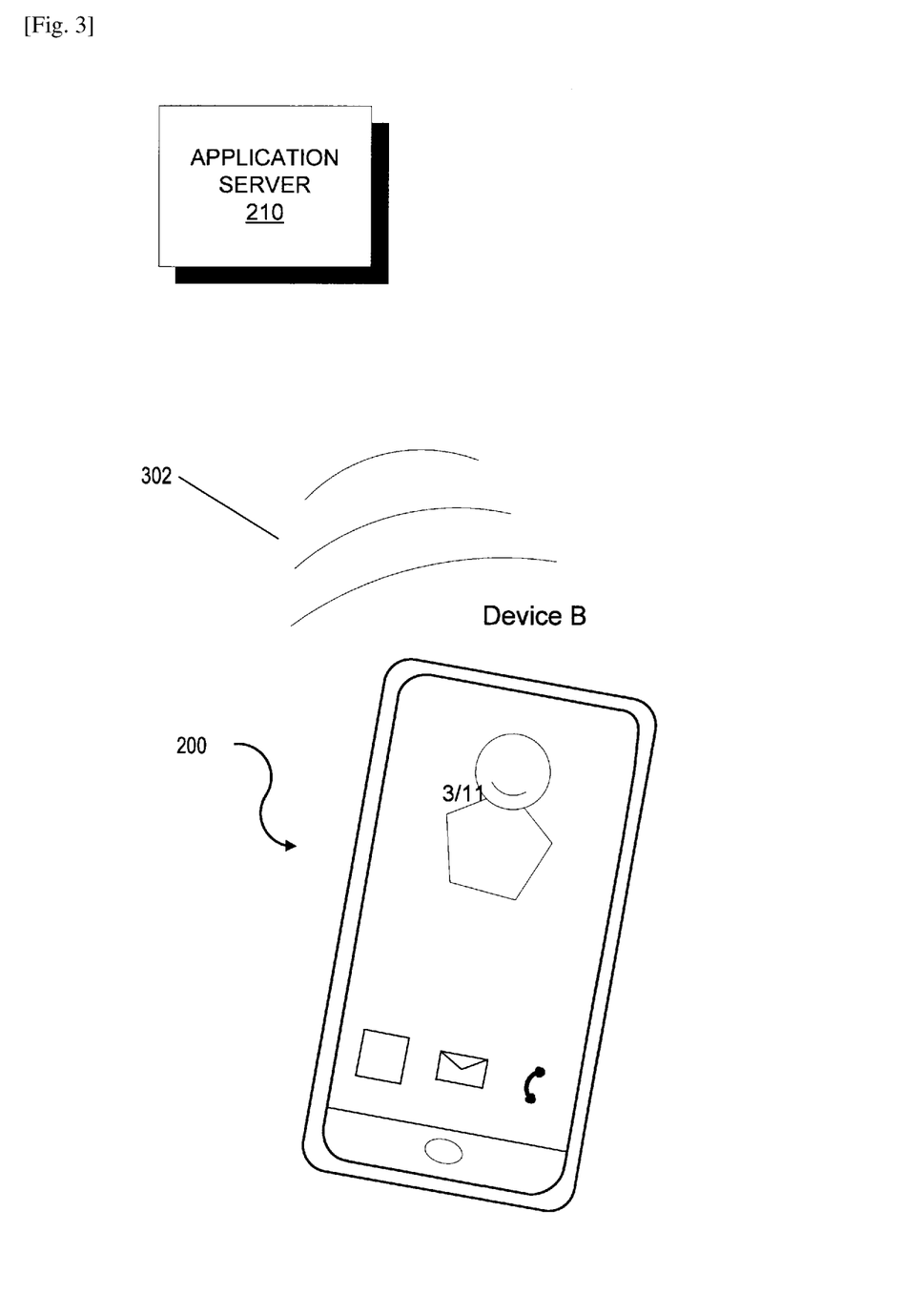
FIG. 3 illustrates a second mobile terminal sending location information to a server, according to various embodiments.

As shown in FIG. 2, mobile terminal 100, may send or push location information 202 to be received by application server 210 (block 606). Likewise, as shown in FIG. 3, mobile terminal 200, may send or push location information 302 to be received by application server 210 (block 608). The location information may be device information, such as a MAC address, along with a coarse-grained location of the device.

Figure 4:
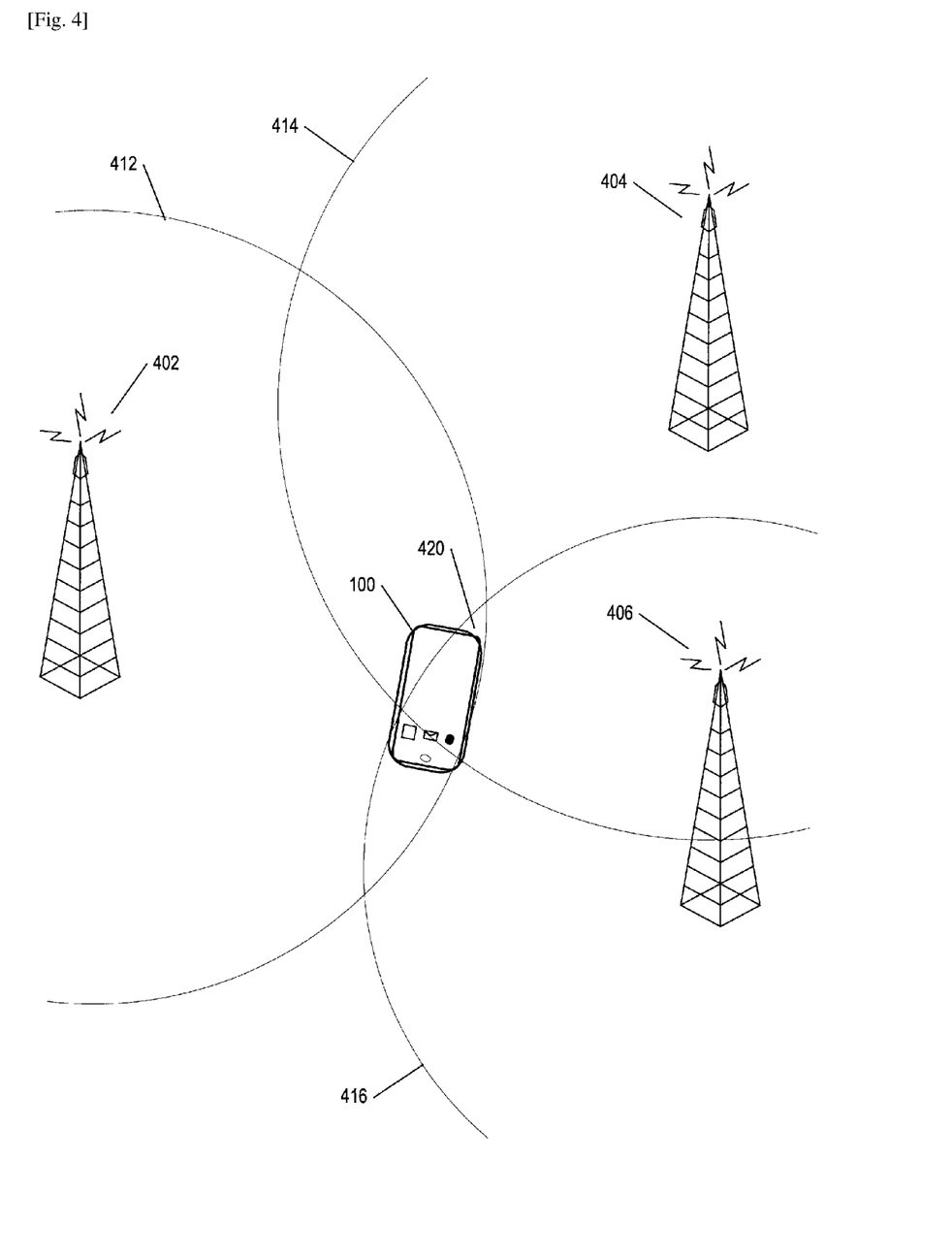
FIG. 4 illustrates a cellular position via cell tower triangulation, according to various embodiments.

For example, coarse-grained location information may include a cellular position and/or a Wi-Fi access point identification. Cellular position may be a cell tower identifier, or cell id. Cellular position may include multiple cell ids. In some cases, cellular position may include a position of the device determined by triangulation of multiple cell towers. Such triangulation may be limited in accuracy, but may be accurate enough to determine that the devices are approaching or are in the same short-range wireless transmission area. For example, as shown in FIG. 4, cell towers 402, 404 and 406 may have transmission ranges and/or directions 412, 414 and 416, respectively, which may be compared to or overlapped with each other to determine a cellular position of mobile terminal 100 to be in area 420.

Figure 5:
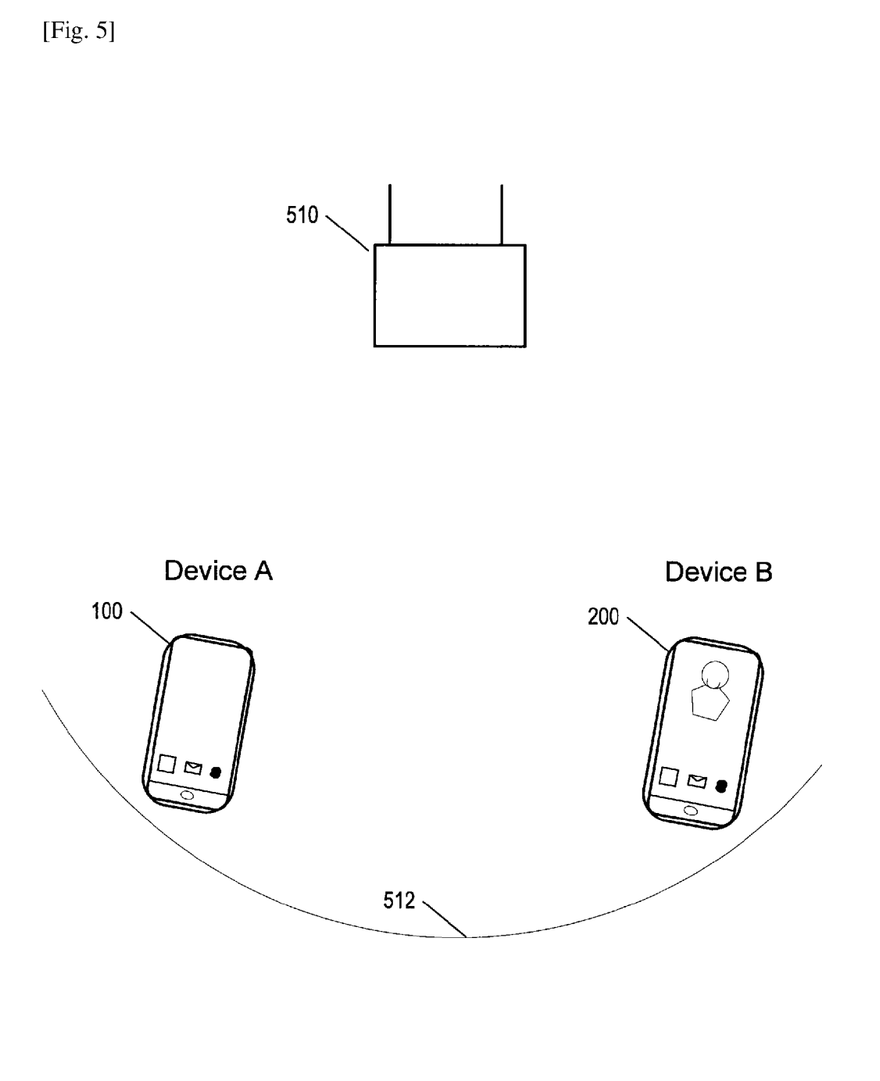
FIG. 5 illustrates mobile terminals sharing a same Wi-Fi access point, according to various embodiments.

Wi-Fi access point information may also be used to determine a location or transmission area of mobile terminals 100 and 200. For example, application server 210 may receive a Wi-Fi access point identifier, or Wi-Fi access point name from each of mobile terminals 100 and 200. Wi-Fi may be considered to include protocols that follow the IEEE 802.11 standards. As shown in FIG. 5, Wi-Fi access point 510 may have mobile terminals 100 and 200 within transmission range 512. Therefore, mobile terminals 100 and 200 may report the same Wi-Fi access point name or identifier as they may be not only in the same Wi-Fi area, but in the same short-range wireless transmission area.

The short-range wireless transmission area (i.e., IEEE 802.15.*, Bluetooth (registered trademark)) is of a shorter range than the Wi-Fi access point or of a Wi-Fi access point generally (i.e., IEEE 802.11*), according to some embodiments. The short-range wireless transmission area is not intended to be the same size as the Wi-Fi transmission area. In various embodiments, the short-range wireless transmission area is smaller than the Wi-Fi transmission area, and may be located within or overlap the Wi-Fi transmission area. For example, the short-range wireless transmission range area may be circular with a 10 m radius, such as is expected with Bluetooth (registered trademark) technology and Bluetooth (registered trademark) low energy (BLE) transmission range areas. In other examples, a higher powered Bluetooth (registered trademark) technology may have a range of 100 m. Some ranges may be 1 m or less. Mobile terminals 100 and 200 may be determined to be within a same short-range wireless transmission area (block 610). This determination may be made when the location information of the first mobile terminal 100 matches or is similar to the location information of the second mobile terminal 200.

Determining a match of location information may include comparing Wi-Fi access point identifiers to determine if they are the same. A match may also be found when the cellular position by triangulation may overlap or be estimated to overlap. A match may also be determined if one or more cell tower ids reported from mobile terminals 100 and 200 are the same. In some cases, it may be more accurate if at least two cell ids reported by mobile terminal 100 and 200 are the same. Cell tower ids may also involve transmission directions from the tower. These directions may also be compared to determine if mobile terminals 100 and 200 are likely in the same transmission area.

Mobile terminals 100 and 200 may send the location information periodically or only when there is a change in the cell id information or the Wi-Fi access point identifier information. This coarse-grained positioning is available on almost any networked device at a low power cost. The location information is received and compared at application server 210.

Figure 7:
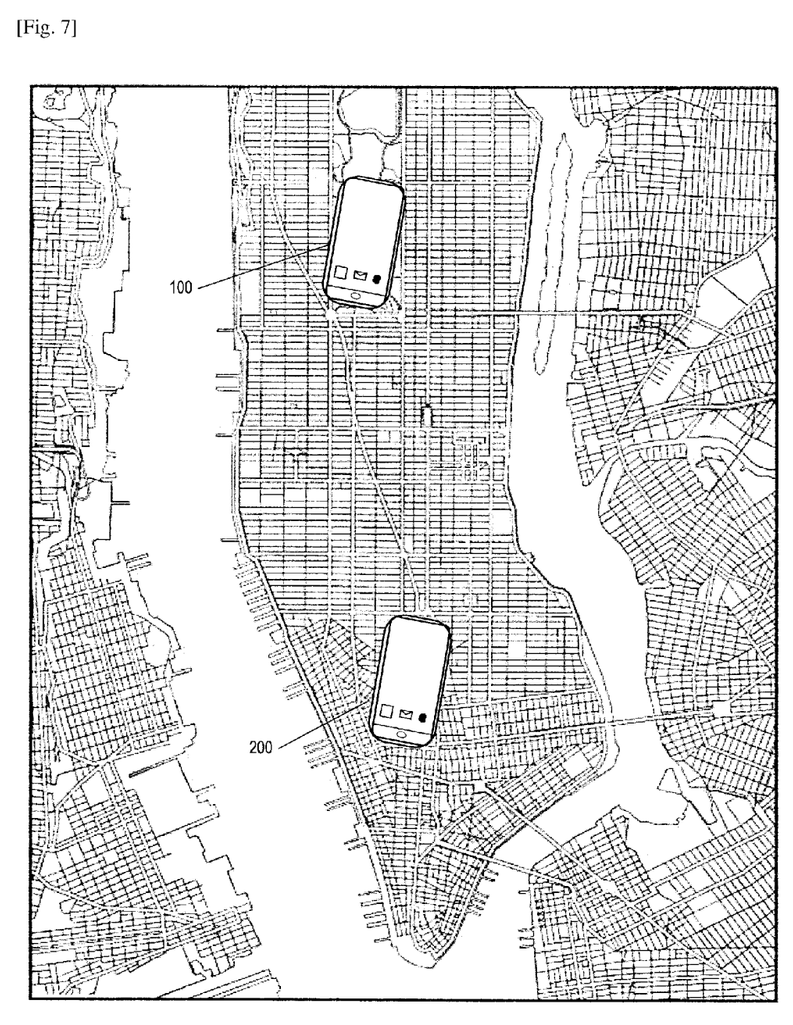
FIG. 7 illustrates two mobile terminals at some distance from each other, according to various embodiments.
Figure 8:
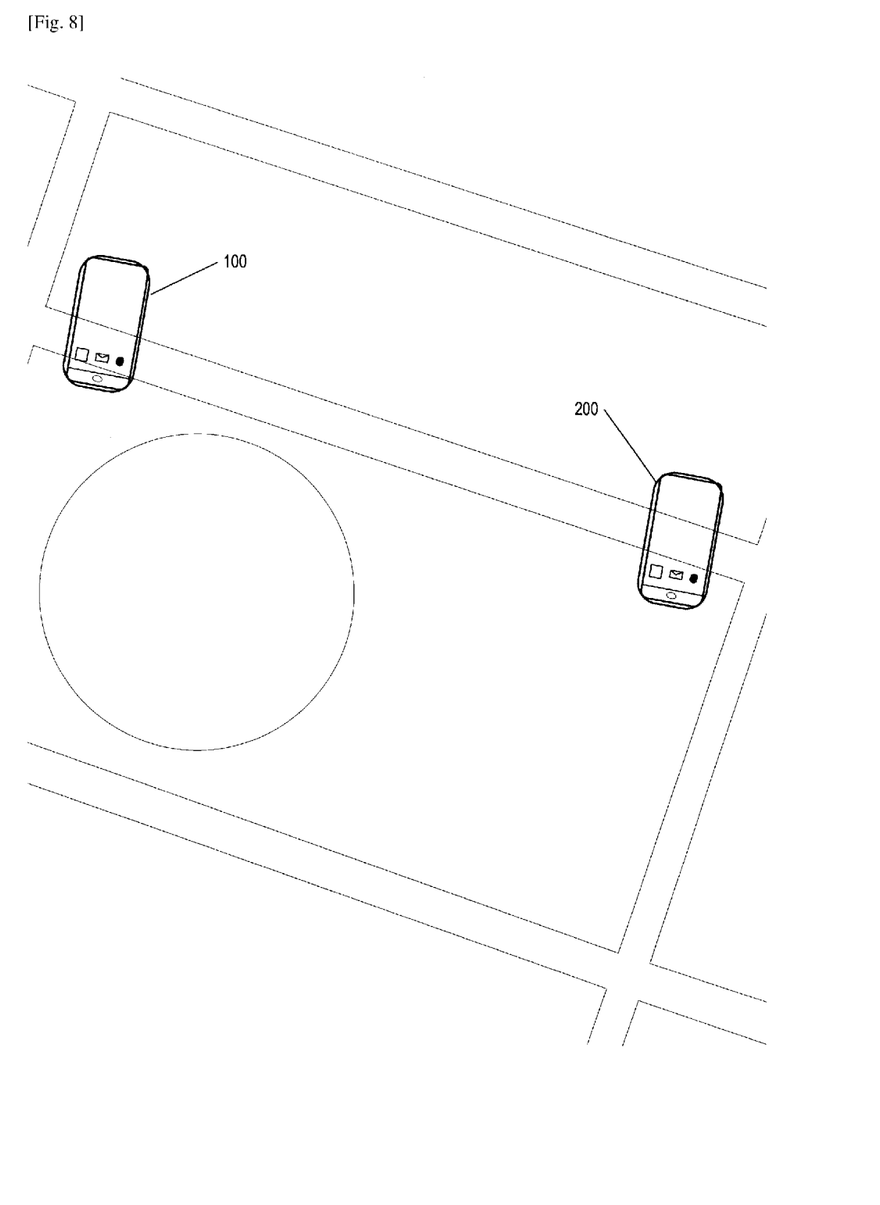
FIG. 8 illustrates the two mobile terminals approaching a same short-range wireless transmission area, according to various embodiments.

In another example, as shown on the outline map of Manhattan Island of New York in FIG. 7, mobile terminal 100 may be in Central Park, while mobile terminal 200 may be at New York University. Application server 120 receives the location information of each mobile terminal and compares the mobile information. Mobile terminals 100 and 200 are determined to be too far apart for short-range wireless transmissions. Perhaps the cell tower id or cellular position reported by mobile terminal 100 is not the same as the cell tower id or cellular position reported by mobile terminal 200. However, when mobile terminals 100 and 200 are in approximately the same geographic region (maybe just outside Madison Square Garden represented by the circle in FIG. 8), and there is a possibility that they can be in close proximity, application server 210 may determine that mobile terminals 100 and 200 are in or are approaching a same short-range wireless transmission area.

Figure 9:
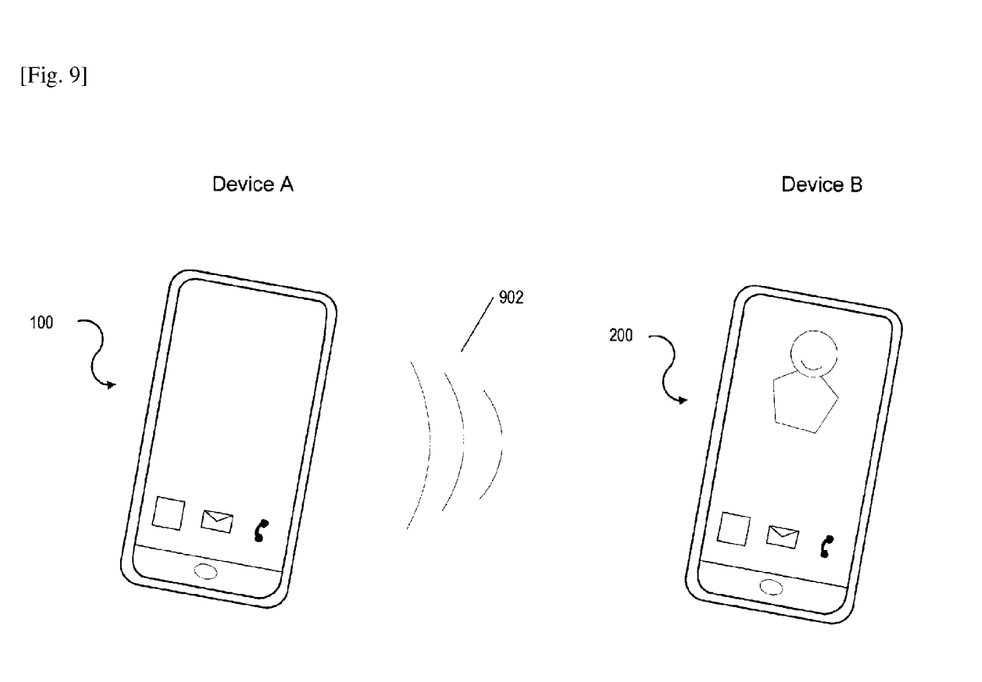
FIG. 9 illustrates a first mobile terminal sending a notification addressed to a second mobile terminal using a short-range wireless transmission protocol, according to various embodiments.

In this example, mobile terminal 100 may have previously sent a request to application server 210 to notify mobile terminal 100 and/or 200 when mobile terminals 100 and 200 are near each other. This may result in a short-range wireless protocol pairing or other application such that mobile terminals 100 and 200 may share photos of the event or other event information if the users are to be seated near each other at the event. Continuing this example, mobile terminals 100 and 200 enter the same building and report the same cellular position and/or Wi-Fi access point identifiers to application server 210, as they are in the same part of the building. When a determination is made by application server 210 that mobile terminals 100 and 200 are in the same short-range wireless transmission area, mobile terminal 100 may receive instructions from application server 210. As a result, mobile terminal 100 may send a notification 902 (FIG. 9) to mobile terminal 200 using the short-range wireless transmission protocol, such as a Bluetooth (registered trademark) protocol or an IEEE 802.15 protocol, indicating the presence of mobile terminal 100 to mobile terminal 200 (block 612). Upon receipt of the notification by mobile terminal 200, some pairing, application activity or some other exchange may take place, enhancing the experience of the users of mobile terminals 100 and 200 without consuming the power necessary to continuously scan for the other device.

In some cases, mobile terminal 200 may be directly addressed, by its MAC address. The scanning may be turned off or disabled for either mobile terminal before, during and/or after the sending of the notification from mobile terminal 100 to mobile terminal 200. In other cases, mobile terminal 100 or mobile terminal 200 may begin scanning or turn on Bluetooth (registered trademark) capability now that the mobile terminals have been notified that the mobile terminals are likely in short-range wireless transmission range or Bluetooth (registered trademark) technology proximity of each other. The mobile terminals, or any system involving the mobile terminals, can be tuned to determine the optimal location lookup frequency and the radius of the region to turn on Bluetooth (registered trademark) capability.

Although Bluetooth (registered trademark) technology is described in examples in this disclosure, the short-range wireless protocols are not limited to Bluetooth (registered trademark) protocols (as maintained by the Bluetooth Special Interest Group) and may be other protocols distinguished from standard Wi-Fi protocols such as IEEE 802.11a, 802.11b, 802.11g, 802.11n and 802.11ac. These other short-range wireless protocols may include IEEE 802.15 protocols such as 802.15.1, 802.15.3 and 802.15.4. For example, location information received at application server 210 may be access point information for IEEE 802.11 access points, while the same short-range wireless transmission area may involve the ranges of IEEE 802.15 protocols. NFC may also be used as a short-range wireless protocol.

Figure 10:
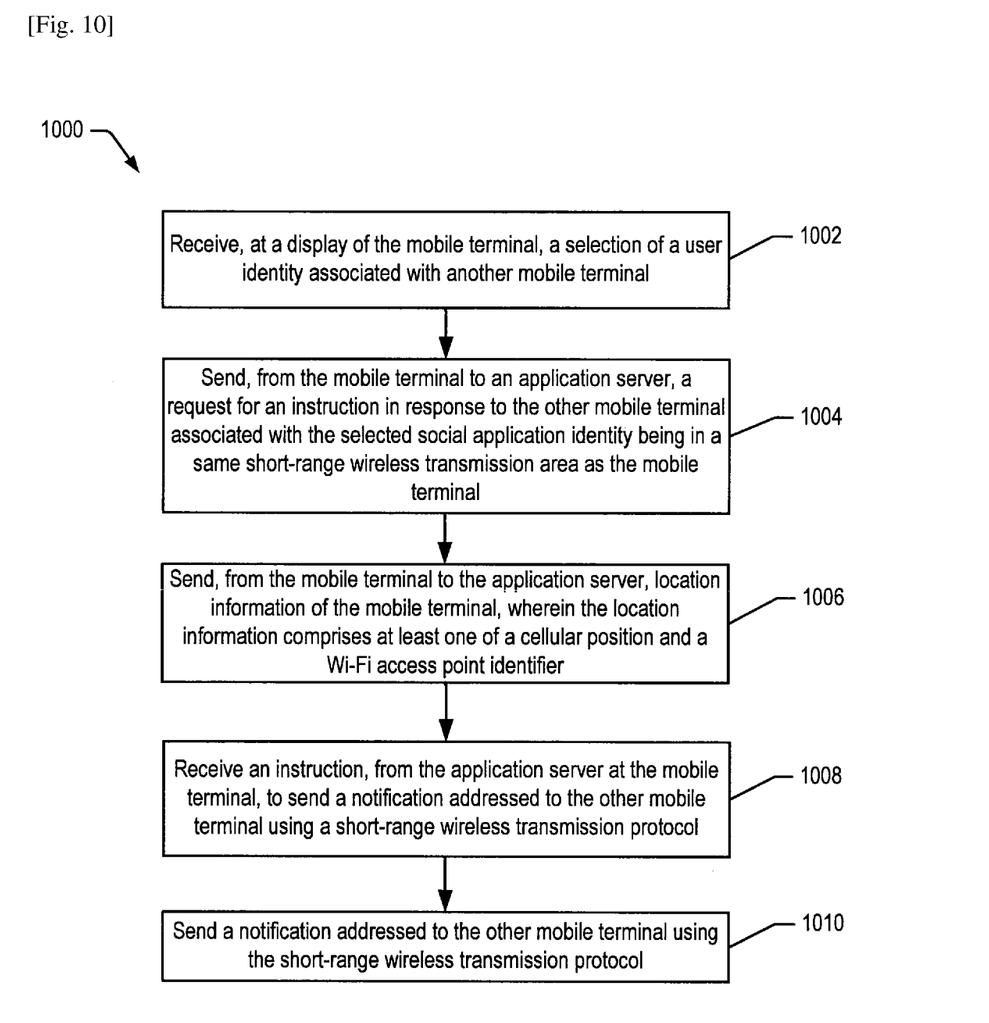
FIG. 10 is a flowchart illustrating another process for a mobile terminal to address another mobile terminal using a short-range wireless protocol, according to various embodiments.

FIG. 10 represents a process 1000 from the viewpoint of the mobile terminal rather than the application server 210, as shown by the process 600 of FIG. 6. At block 1002, a selection of a user identity associated with another mobile terminal is received. This selection may be made at the mobile terminal, such as at a touch screen display, keyboard, speaker, sensor, camera or other input of the mobile terminal, such as shown in FIG. 1.

At block 1004, a request is sent from the mobile terminal for an instruction from the application server when the other mobile terminal is in the same short-range wireless transmission area. This request may be made as part of an application downloaded and installed on the mobile terminal. Application server 210 may register and/or store MAC addresses, phone numbers, social application identities and/or other user identity information specific to the application or to other popular communication or social network applications.

At block 1006, the location information of the mobile terminal is sent to application server 210 or any other cloud server handling the application service. This may be sent as a service of the operating system, location application or other service.

At block 1008, an instruction is received from application server 210, instructing the mobile terminal to send a notification addressed to the other terminal using the short-range wireless transmission protocol, such as a Bluetooth (registered trademark) protocol. At block 1010, the notification is sent. The notification may be sent addressed to the MAC address of the other mobile terminal. This may be a request for a pairing, initiation of a pairing previously configured, a connection, or a simple awareness message.

Figure 11:
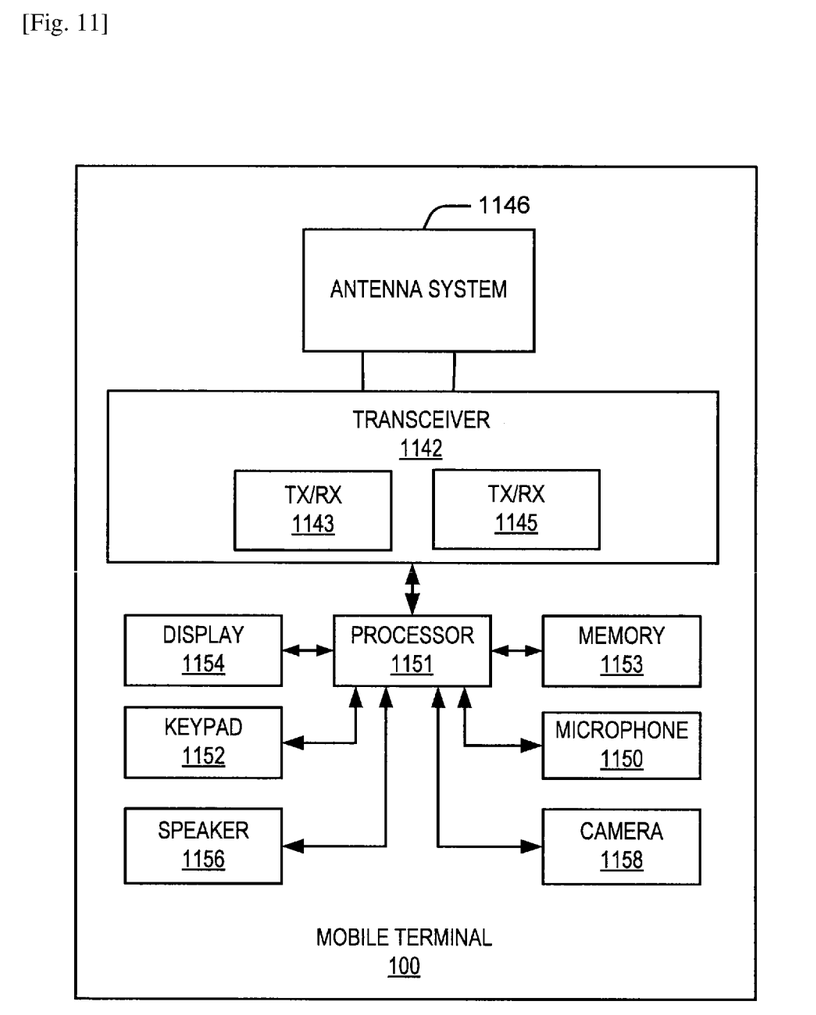
FIG. 11 illustrates a block diagram of a mobile terminal, according to various embodiments.

Mobile terminal 100 may be a mobile electronic device, such as a smartphone, and include computing device and communication components shown in FIG. 11. FIG. 11 is a schematic block diagram of mobile terminal 100, according to various embodiments. The diagram of mobile terminal 100 is not limited to a mobile terminal. The diagram of mobile terminal 100 may also include parts of another electronic device, such as mobile terminal 200 and/or application server 210. Mobile terminal 100 may communicate with a wireless local network, the internet or other devices using a communication protocol that may include, but is not limited to, IEEE 802.11a, 802.11b, 802.11g, 802.11n, 802.11ac, and/or other wireless local area network protocols. The short-range transmission protocols may involve Bluetooth (registered trademark) protocols, IEEE 802.15 protocols, near field communication (NFC) protocols or some other RFID protocols or standards. According to some embodiments, short-range transmission protocols may also include other certain IEEE standards that are not 802.11 but are similar in range to the short-range wireless transmission protocols described herein.

In some embodiments, mobile terminal 100 includes various components, such as a processor 1151, an antenna system 1146, a cellular and/or Wi-Fi transceiver 1142 (e.g., multi-band with transceivers 1143 and 1145), a memory 1153, display 1154, keypad 1152, speaker 1156, microphone 1150 and/or camera 1150. Some embodiments provide that the display 1154 may include a touch sensitive display or screen, or the like.

The memory 1153 stores software that may be executed by the processor 1151, and may include one or more erasable programmable read-only memories (EPROM or Flash EPROM), battery backed random access memory (RAM), magnetic, optical, or other digital storage device, and may be separate from, or at least partially within, the processor 1151. The processor 1151 may include more than one processor, such as, for example, a general purpose processor and a digital signal processor, which may be enclosed in a common package or separate and apart from one another. In particular, the processor 1151 may be configured to control various functions of mobile terminal 100, including receiving input from a touch sensitive screen or other sensors.

Mobile terminal 100 may communicate with a base station of a network using radio frequency signals, which may be communicated through antenna system 1146. For example, mobile terminal 100 may be configured to communicate via the cellular transceiver 1142 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS), among others. Communication protocols as used herein may specify the information communicated, the timing, the frequency, the modulation, and/or the operations for setting-up and/or maintaining a communication connection. In some embodiments, the antenna system 1146 may be a single antenna.

It is to be understood that the present invention is not limited to the particular configurations shown in FIG. 11, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture may be implemented as a single processor system or a multi-processor system in accordance with various embodiments of the present invention.

Embodiments of the present invention may include methods, electronic devices, and/or computer program products. Some embodiments of the present invention are described with reference to block diagrams and/or operational illustrations of methods and electronic devices. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations can be embodied on analog circuitry and/or digital circuitry. These program instructions may be provided to a controller circuit, which may include one or more general purpose processors, special purpose processors, ASICs, and/or other programmable data processing apparatus, such that the instructions, which execute via the controller, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a controller circuit to function in a particular manner, such that the instructions stored in the computer usable or computer-readable memory produce an article of manufacture including instructions that implement the function specified in the flowchart and/or block diagram block or blocks. The computer-usable or computer-readable medium may be, for example but not limited to, an electronic, magnetic, optical, electromagnetic, or semiconductor system, apparatus, or device. More specific examples (a non-exhaustive list) of the computer-readable medium include the following: hard disk devices, optical storage devices, magnetic storage devices, random access memory (RAM) devices, read-only memory (ROM) devices, erasable programmable read-only memory (EPROM or Flash memory) devices, and compact disc read-only memory (CD-ROM).

The embodiments described herein may provide for use of short-range wireless protocols without the need to indefinitely scan for other devices, increasing security and saving battery power.

Many different embodiments have been disclosed herein and different applications/variations will be apparent to a skilled person having knowledge of the present disclosure. In the drawings and specification, there have been disclosed typical embodiments of the invention and, although specific terms are employed, they are used in a generic and descriptive sense only and not for purposes of limitation, the scope of the invention being set forth in the following claims. It would be understood that it would be unduly repetitious and obfuscating to literally describe and illustrate every combination and subcombination of these embodiments. Accordingly, the present specification, including the drawings, shall be construed to constitute a complete written description of all combination and subcombinations of the embodiments of the present invention described herein, and of the manner and process of making and using them, and shall support claims to any such combination or subcombination.

In the specification, there have been disclosed embodiments of the invention and, although specific terms are employed, they are used in a generic and descriptive sense only and not for purposes of limitation.

The invention claimed is:

1. An electronic device, comprising:
   a processor; and
   a memory coupled to the processor and comprising computer readable program code embodied in the memory that when executed by the processor causes the processor to perform operations comprising:
   receiving, at the electronic device, first location information of a first mobile terminal, wherein the first location information comprises at least one of a cellular position and a Wi-Fi access point identifier;
   receiving, at the electronic device, second location information of a second mobile terminal, wherein the second location information comprises at least one of a cellular position and a Wi-Fi access point identifier;
   determining whether the first mobile terminal is in a same short-range wireless transmission area as the second mobile terminal based on a comparison of the first location information with the second location information; and
   responsive to a determination that the first mobile terminal is in the same short-range wireless transmission area as the second mobile terminal, sending an instruction to the first mobile terminal instructing the first mobile terminal to send a notification addressed to the second mobile terminal using a short-range wireless transmission protocol, the short-range wireless transmission protocol comprising a short-range wireless transmission area with a maximum radius of about 10 m,
   wherein the instruction further instructs the first mobile terminal to send the notification while scanning for other devices using the short-range wireless transmission protocol is turned off for the first mobile terminal.

2. The electronic device of claim 1, wherein the short-range wireless transmission protocol is not a Wi-Fi IEEE 802.11 protocol.

3. The electronic device of claim 1, wherein the short-range wireless transmission protocol is at least one of an IEEE 802.15 protocol and a Bluetooth® protocol.

4. The electronic device of claim 1, wherein at least one of the cellular position of the first mobile terminal and the cellular position of the second mobile terminal comprises at least one cell tower identifier.

5. The electronic device of claim 1, wherein at least one of the cellular position of the first mobile terminal and the cellular position of the second mobile terminal comprises cell tower triangulation information.

6. The electronic device of claim 1, wherein the notification is addressed to a MAC address of the second mobile terminal.

7. The electronic device of claim 1, wherein the operations further comprise:
   storing a first user identity corresponding to a MAC address of the first mobile terminal; and
   storing a second user identity corresponding to a MAC address of the second mobile terminal, and
   wherein the determining is performed responsive to receiving a request from the first mobile terminal, the request including the second user identity.

8. The electronic device of claim 1, wherein sending an instruction to the first mobile terminal comprises instructing the first mobile terminal to turn on the short-range wireless transmission protocol.

9. A method, comprising:
   receiving, at an electronic device, first location information of a first mobile terminal, wherein the first location information comprises at least one of a cellular position and a Wi-Fi access point identifier;
   receiving, at the electronic device, second location information of a second mobile terminal, wherein the second location information comprises at least one of a cellular position and a Wi-Fi access point identifier;
   determining whether the first mobile terminal is in a same short-range wireless transmission area as the second mobile terminal based on a comparison of the first location information with the second location information; and responsive to a determination that the first mobile terminal is in the same short-range wireless transmission area as the second mobile terminal, sending an instruction to the first mobile terminal instructing the first mobile terminal to send a notification addressed to the second mobile terminal using a short-range wireless transmission protocol, the short-range wireless transmission protocol comprising a short-range wireless transmission area with a maximum radius of about 10 m, wherein the instruction further instructs the first mobile terminal to send the notification while scanning for other devices using the short-range wireless transmission protocol is turned off for the first mobile terminal.

10. The method of claim 9, wherein the short-range wireless transmission protocol is at least one of an IEEE 802.15 protocol and a Bluetooth® protocol.

11. The method of claim 9, wherein at least one of the cellular position of the first mobile terminal and the cellular position of the second mobile terminal comprises at least one cell tower identifier.

12. The method of claim 9, wherein at least one of the cellular position of the first mobile terminal and the cellular position of the second mobile terminal comprises cell tower triangulation information.

13. The method of claim 9, wherein the notification is addressed to a MAC address of the second mobile terminal.

14. The method of claim 9, wherein sending an instruction to the first mobile terminal comprises instructing the first mobile terminal to turn on the short-range wireless transmission protocol.

15. A mobile terminal, comprising:
a processor; and
a memory coupled to the processor and comprising computer readable program code embodied in the memory that when executed by the processor causes the processor to perform operations comprising:
receiving, at the mobile terminal, a selection of a user identity associated with another mobile terminal;
sending, from the mobile terminal to an application server, a request for an instruction in response to the other mobile terminal associated with the selected user identity being in a same short-range wireless transmission area as the mobile terminal;
sending, from the mobile terminal to the application server, location information of the mobile terminal, wherein the location information comprises at least one of a cellular position and a Wi-Fi access point identifier;
receiving an instruction, from the application server at the mobile terminal, to send a notification addressed to the other mobile terminal using a short-range wireless transmission protocol; and
sending a notification addressed to the other mobile terminal using the short-range wireless transmission protocol, the short-range wireless transmission protocol comprising a short-range wireless transmission area with a maximum radius of about 10 m,
wherein the sending a notification is performed while scanning for other devices using the short-range wireless transmission protocol is turned off.

16. The mobile terminal of claim 15, wherein the short-range wireless transmission protocol is at least one of an IEEE 802.15 protocol and a Bluetooth® protocol.

17. The mobile terminal of claim 15, wherein the cellular position comprises at least one cell tower identifier.

18. The mobile terminal of claim 15, wherein the cellular position comprises cell tower triangulation information.

19. The mobile terminal of claim 15, wherein the notification is addressed to a MAC address of the other mobile terminal.

20. The mobile terminal of claim 15, wherein the sending a notification comprises turning on the short-range wireless transmission protocol in response to receiving the instruction.

* * * * *